A. P. ANDERSON.
COVER OR CLOSURE FOR RECEPTACLES.
APPLICATION FILED DEC. 9, 1907. RENEWED FEB. 8, 1912.
1,035,841.  Patented Aug. 20, 1912.
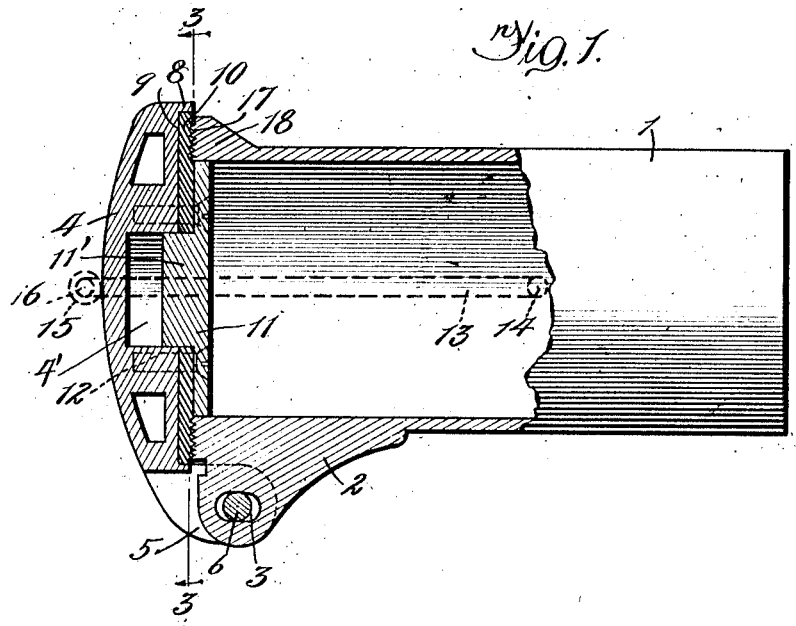
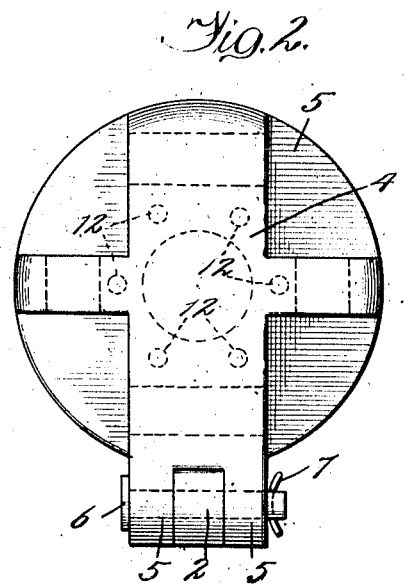
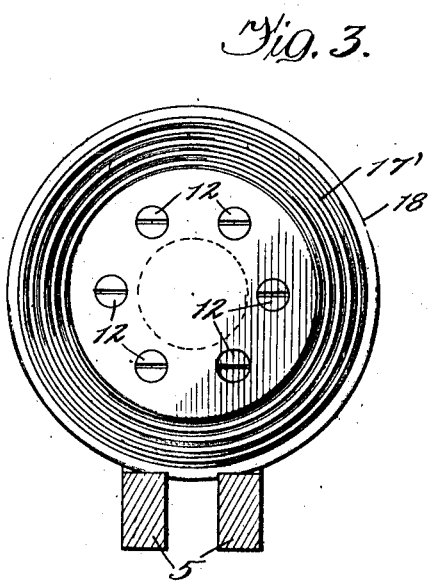

UNITED STATES PATENT OFFICE.

ALEXANDER P. ANDERSON, OF CHICAGO, ILLINOIS.

COVER OR CLOSURE FOR RECEPTACLES.

1,035,841. Specification of Letters Patent. Patented Aug. 20, 1912.

Original application filed August 3, 1906, Serial No. 329,030. Divided and this application filed December 9, 1907, Serial No. 405,820. Renewed February 8, 1912. Serial No. 676,440.

*To all whom it may concern:*

Be it known that I, ALEXANDER P. ANDERSON, a citizen of the United States, residing at Chicago, in the county of Cook and State of Illinois, have invented new and useful Improvements in Covers or Closures for Receptacles, of which the following is a full, clear, concise, and exact description, reference being had to the accompanying drawing, forming a part of this specification.

My invention relates to improvements in covers or closures for receptacles, and has for its object the provision of a form of cover whereby a tight, sealed joint is readily effected between opposing contacting surfaces on the cover and the receptacle.

This subject-matter herein set forth has been divided out of my copending case, Serial No. 329,030, filed August 3, 1906, so that the present application is a divisional one of my aforesaid copending case.

Referring to the drawings, wherein I have illustrated a preferred embodiment of my invention,—

Figure 1 is partly a longitudinal sectional view of a receptacle provided with my improved cover, a fastening device for the cover being indicated in dotted lines; Fig. 2 is a front end elevation of Fig. 1; and Fig. 3 is a view taken on line 3—3 of Fig. 1, looking in the direction indicated by the arrows.

A receptacle 1 is provided at one end with a lug 2 having a slot 3. The cover 4 carries a pair of spaced lugs 5 arranged to straddle the projection or lug 2 on the receptacle, as clearly shown in Fig. 2. A connecting pin 6 passes through openings in the lugs 5 and through the slot 3 in the projection 2. Any suitable locking device, such as a key 7, may be employed to prevent displacement of the pin. It will be observed from Fig. 1 that the slotted pivotal connection between the cover and the receptacle permits the cover to have a pivotal as well as a bodily or longitudinal movement. The latter movement is made possible by the movement of the pin 6 in the slot or elongated opening 3. The purpose of such longitudinal movement will presently be made clear.

The cover is provided with a circular lip 8, and in the depression or recess 9 thus formed is located a gasket 10 of some soft or yieldable material, as, for instance, lead. This gasket is held in place by a clamping-plate or disk 11 secured to the cover by screws or bolts 12 which pass through the gasket into the cover, as indicated by dotted lines in Fig. 1. In the particular example illustrated in Fig. 1, the gasket is in the shape of a ring through which extends the boss or projection 11' on the clamping-plate. By causing said projection to extend snugly into the accommodating hollow 4' in the cover, I provide additional centering means for the clamping-plate on the cover, thereby increasing the firmness and security with which the gasket is maintained in place. To prevent the clamping-plate from interfering with the proper seating of the cover upon the receptacle when the clamping-plate of projects beyond the gasket, it is necessary to make the plate of slightly smaller diameter than the internal diameter of the receptacle at that portion, in order that the plate may be harbored within the receptacle, as shown in Fig. 1.

Any suitable locking means may be employed for holding the cover clamped upon the receptacle. For the sake of illustration, I have indicated in dotted lines in Fig. 1 a convenient form of bail 13 which may be pivotally secured to the receptacle, as at 14, and carry a roller 15 on the transverse portion 16 extending across the cover. Of course, any other device, whether attached to the receptacle or cover, or separate from both, may be employed for holding the cover upon the receptacle, since such device forms no part of my invention as herein claimed.

I order to effect a sealed joint between the cover and the receptacle, I provide the open end of the latter with a roughened surface 17 shown pictorially in Fig. 1 as a grooved surface. When the cover is pressed against the receptacle, the projections or protuberances constituting the roughened surface will enter or sink into the yieldable material of the gasket as indicated in Fig. 1, causing the coöperating face of the gasket to assume a correspondingly roughened surface, as shown at 17' in Fig. 3. Not only is by this means the contact-area between the cover and the receptacle increased, but the contact between the parts is so firm and compact that what might be termed a sealed joint is effected. This is particularly true if the gasket be of some soft metal, such as lead, into which the roughened surface of the receptacle will sink with great firmness. Crowding out of the material of the gasket is prevented by the surrounding lip 8. The slotted pivotal connection, above referred to, between the cover and the receptacle plays quite an important factor in the production of a sealed joint. Any wear or crowding out of the gasket due to repeated closing is compensated for by the slight bodily movement of the cover to cause the same to be seated tightly upon the receptacle with even pressure all around, whatever the condition of the gasket. Were it not for this bodily or longitudinal movement of the cover, the gasket would be subjected to greater pressure at the portion nearest the pivot, since that portion would come into contact with the receptacle before the opposite portion of the gasket would.

Although I have shown the roughened surface produced by means of circular corrugations, it is plain to see that it might be readily produced in various other ways. Furthermore, although the roughened surface is shown on an enlarged portion 18 at the open end of the receptacle, it is understood that the latter itself may be constructed of such thickness that a special enlargement at the open end for the roughened surface may not be necessary. Again, although I have chosen to show the cover in a form of a casting cored out at certain parts for the sake of lightness, and provided with a curved outer surface, I would have it understood that any suitable configuration may be resorted to so long as it is adapted to receive the gasket for coöperation with the receptacle to produce a sealed joint.

Having thus described my invention, what I claim as new and desire to secure by Letters Patent, is:

1. The combination with a receptacle, of a cover therefor connected to one end of the receptacle so as to have both pivotal and bodily movement, means for clamping said cover in position, a soft-metal gasket carried by said cover, a clamping plate secured to the cover for holding the gasket in position, the diameter of said plate being slightly smaller than the internal diameter of the receptacle at said end, whereby the said plate is caused to fit snugly into the receptacle to enable the cover to be accurately closed, and a roughened surface on said end of the receptacle to coöperate with the gasket, upon closing of the cover, to effect a sealed joint.

2. The combination with a receptacle, of a cover therefor connected to one end of the receptacle so as to have both pivotal and bodily movement, means for clamping said cover in position, said cover having a recess on the inner face thereof, a soft-metal ring-shaped gasket in said recess, a clamping plate having a boss extending through said gasket, said plate being secured to the cover and holding the gasket in position and being arranged to fit within said receptacle, and a roughened surface on said end of the receptacle to coöperate with the gasket, to enable the cover to be accurately closed, to effect a sealed joint.

3. The combination with a receptacle having a thickened wall at the open end thereof, of a cover arranged to close said end of the receptacle, said cover having slot-and-pin connection with the receptacle, means for clamping said cover in position, a soft-metal gasket carried by the cover, a plate secured to the cover for clamping said gasket in position and extending into the receptacle to engage therein and center the cover with respect thereto, and a roughened surface on said end to coöperate with the gasket and effect a sealed joint between the receptacle and cover.

4. The combination with a receptacle, of a cover therefor, means connecting the cover to one end of the receptacle so as to permit pivotal movement of the cover and also independent movement thereof axially of the mouth of the receptacle to enable the same to be accurately closed, means for clamping said cover in position, a soft-metal gasket carried by said cover, a lip on said cover extending around said gasket, a plate arranged to engage within the receptacle for centering the cover therein, said plate being secured to the cover and extending over a portion of the gasket for clamping said gasket in position, the wall of the receptacle being thickened around the mouth thereof, and being roughened to coöperate with the gasket to effect a sealed joint.

In witness whereof, I have hereunto subscribed my name in the presence of two witnesses.

ALEXANDER P. ANDERSON.

Witnesses:
   A. A. THOMAS,
   M. R. ROCHFORD.

It is hereby certified that in Letters Patent No. 1,035,841, granted August 20, 1912, upon the application of Alexander P. Anderson, of Chicago, Illinois, for an improvement in "Covers or Closures for Receptacles," errors appear in the printed specification requiring correction as follows: Page 1, line 72, strike out the word "of"; same page, line 92, for the capital letter "I" read *In;* and that the said Letters Patent should be read with these corrections therein that the same may conform to the record of the case in the Patent Office.

Signed and sealed this 29th day of October, A. D., 1912.

[SEAL.]

C. C. BILLINGS,
*Acting Commissioner of Patents.*